US011663498B2

(12) United States Patent
Tokarev Sela et al.

(10) Patent No.: US 11,663,498 B2
(45) Date of Patent: May 30, 2023

(54) SYSTEM AND METHOD FOR GENERATING ORGANIZATIONAL MEMORY USING SEMANTIC KNOWLEDGE GRAPHS

(71) Applicant: Sisense Ltd., Ramat Gan (IL)

(72) Inventors: Inna Tokarev Sela, Tel Aviv (IL); Yael Lev, Tel Aviv (IL); Guy Boyangu, Tel Aviv (IL)

(73) Assignee: SISENSE LTD., Ramat Gan (IL)

( * ) Notice: Subject to any disclaimer, the term of this patent is extended or adjusted under 35 U.S.C. 154(b) by 0 days.

(21) Appl. No.: 16/876,943

(22) Filed: May 18, 2020

(65) Prior Publication Data

US 2020/0372373 A1  Nov. 26, 2020

Related U.S. Application Data

(60) Provisional application No. 62/850,760, filed on May 21, 2019.

(51) Int. Cl.
*G06N 5/02* (2023.01)
*G06F 16/9035* (2019.01)
*G06F 16/28* (2019.01)
*G06F 16/2457* (2019.01)

(52) U.S. Cl.
CPC ......... *G06N 5/02* (2013.01); *G06F 16/24578* (2019.01); *G06F 16/285* (2019.01); *G06F 16/9035* (2019.01)

(58) Field of Classification Search
CPC ............ G06N 5/00; G06N 5/02; G06N 5/022; G06N 5/025; G06F 16/211; G06F 16/24522; G06F 16/24578; G06F 16/248; G06F 16/285; G06F 16/288; G06F 16/36; G06F 16/9024; G06F 16/90335; G06F 16/9035; G06F 16/9038; G06F 40/30; G06F 2201/86
See application file for complete search history.

(56) References Cited

U.S. PATENT DOCUMENTS

| | | |
|---|---|---|
| 6,519,592 B1 | 2/2003 | Getchius et al. |
| 8,412,727 B1 | 4/2013 | Das et al. |
| 9,305,092 B1 | 4/2016 | Finkelstein et al. |
| 9,558,265 B1 | 1/2017 | Tacchi et al. |
| 10,216,860 B2 | 2/2019 | Miranker et al. |
| 10,452,458 B2 | 10/2019 | Seto |

(Continued)

*Primary Examiner* — Robert W Beausoliel, Jr.
*Assistant Examiner* — Cheryl M Shechtman
(74) *Attorney, Agent, or Firm* — M&B IP Analysts, LLC

(57) ABSTRACT

A system and method for generating a semantic graph. The method includes: parsing each of a plurality of events into a plurality of objects, wherein the plurality of events includes a plurality of queries, wherein each event of the plurality of events is related to an interaction with at least one data source; determining, for each of the plurality of events, a relationship between two objects of the plurality of objects; and generating a semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a relationship between the objects connected by the edge.

19 Claims, 7 Drawing Sheets

(56) References Cited

U.S. PATENT DOCUMENTS

| | | | |
|---|---|---|---|
| 10,997,244 | B2 | 5/2021 | Russell et al. |
| 2003/0033288 | A1 | 2/2003 | Shanahan et al. |
| 2008/0140643 | A1 | 6/2008 | Ismalon |
| 2010/0281029 | A1* | 11/2010 | Parikh .................... G06Q 30/02 707/769 |
| 2013/0218898 | A1 | 8/2013 | Raghavan et al. |
| 2013/0226562 | A1 | 8/2013 | Arnon |
| 2014/0280307 | A1* | 9/2014 | Gupta .................... G06N 5/025 707/769 |
| 2014/0330804 | A1 | 11/2014 | Bao et al. |
| 2014/0344265 | A1 | 11/2014 | Boucher et al. |
| 2014/0372931 | A1 | 12/2014 | Zhai et al. |
| 2015/0169758 | A1 | 6/2015 | Assom et al. |
| 2015/0370787 | A1* | 12/2015 | Akbacak ................. G06F 40/47 704/2 |
| 2016/0239758 | A1* | 8/2016 | Jeong ...................... G06N 7/01 |
| 2016/0267166 | A1 | 9/2016 | Kohlmeier et al. |
| 2016/0373456 | A1 | 12/2016 | Vermeulen et al. |
| 2017/0068903 | A1 | 3/2017 | Hakkani-Tur et al. |
| 2017/0076206 | A1 | 3/2017 | Lastras-Montano et al. |
| 2017/0329844 | A1 | 11/2017 | Tacchi et al. |
| 2017/0330094 | A1* | 11/2017 | Lindsley ................ G06N 20/00 |
| 2017/0344711 | A1* | 11/2017 | Liu ........................ G16H 50/20 |
| 2018/0082183 | A1 | 3/2018 | Hertz et al. |
| 2018/0129959 | A1 | 5/2018 | Gustafson et al. |
| 2018/0137424 | A1 | 5/2018 | Royval et al. |
| 2018/0150750 | A1 | 5/2018 | Verdejo et al. |
| 2018/0218066 | A1 | 8/2018 | Krishnan et al. |
| 2018/0357238 | A1 | 12/2018 | Cowan et al. |
| 2019/0057310 | A1 | 2/2019 | Olmstead et al. |
| 2019/0087755 | A1 | 3/2019 | Hull et al. |
| 2019/0095530 | A1* | 3/2019 | Booker ................ G06F 16/313 |
| 2019/0129961 | A1 | 5/2019 | Maiti |
| 2019/0146970 | A1 | 5/2019 | Chamieh et al. |
| 2019/0278777 | A1 | 9/2019 | Malik et al. |
| 2019/0294732 | A1* | 9/2019 | Srinivasan ............ G06F 16/907 |
| 2019/0324780 | A1 | 10/2019 | Zhu et al. |
| 2020/0097560 | A1 | 3/2020 | Kulkarni |
| 2020/0117658 | A1 | 4/2020 | Venkata et al. |
| 2020/0134492 | A1* | 4/2020 | Copeland ................ G06N 5/04 |
| 2020/0250235 | A1* | 8/2020 | Abhyankar .......... G06F 16/9024 |
| 2020/0301953 | A1* | 9/2020 | Abhyankar .......... G06F 16/3328 |
| 2020/0372026 | A1* | 11/2020 | Hyde .................... G06F 16/211 |
| 2020/0372373 | A1 | 11/2020 | Sela et al. |
| 2020/0409955 | A1 | 12/2020 | Sela et al. |
| 2021/0064609 | A1* | 3/2021 | Riscutia ................ G06F 16/258 |
| 2021/0166141 | A1 | 6/2021 | Taguchi et al. |
| 2022/0075948 | A1 | 3/2022 | Yuan et al. |

\* cited by examiner

SYSTEM AND METHOD FOR GENERATING ORGANIZATIONAL MEMORY USING SEMANTIC KNOWLEDGE GRAPHS

CROSS-REFERENCE TO RELATED APPLICATIONS

This application claims the benefit of U.S. Provisional Application No. 62/850,760 filed on May 21, 2019, the contents of which are hereby incorporated by reference.

TECHNICAL FIELD

The disclosure generally relates to business intelligence systems, and particularly to providing ease of use and increasing insights gained from business intelligence systems.

BACKGROUND

Business Intelligence is a field of endeavor which, among other things, attempts to give raw data (e.g., collected measurements) meaning and context which a human user can use to gain insights. Improving the ability to provide insights, store data, and give context, are all advantageous in this field.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for generating a semantic graph based on interactions with a data source. The method comprises: parsing each of a plurality of events into a plurality of objects, wherein the plurality of events includes a plurality of queries, wherein each event of the plurality of events is related to an interaction with at least one data source; determining, for each of the plurality of events, a relationship between two objects of the plurality of objects; and generating a semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a relationship between the objects connected by the edge.

Certain embodiments disclosed herein also include a non-transitory computer readable medium having stored thereon causing a processing circuitry to execute a process, the process comprising: parsing each of a plurality of events into a plurality of objects, wherein the plurality of events includes a plurality of queries, wherein each event of the plurality of events is related to an interaction with at least one data source; determining, for each of the plurality of events, a relationship between two objects of the plurality of objects; and generating a semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a relationship between the objects connected by the edge.

Certain embodiments disclosed herein also include a system for generating a semantic graph based on interactions with a data source. The system comprises: a processing circuitry; and a memory, the memory containing instructions that, when executed by the processing circuitry, configure the system to: parse each of a plurality of events into a plurality of objects, wherein the plurality of events includes a plurality of queries, wherein each event of the plurality of events is related to an interaction with at least one data source; determine, for each of the plurality of events, a relationship between two objects of the plurality of objects; and generate a semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a relationship between the objects connected by the edge.

BRIEF DESCRIPTION OF THE DRAWINGS

The foregoing and other objects, features and advantages will become apparent and more readily appreciated from the following detailed description taken in conjunction with the accompanying drawings, in which.

DETAILED DESCRIPTION

Figure 1:
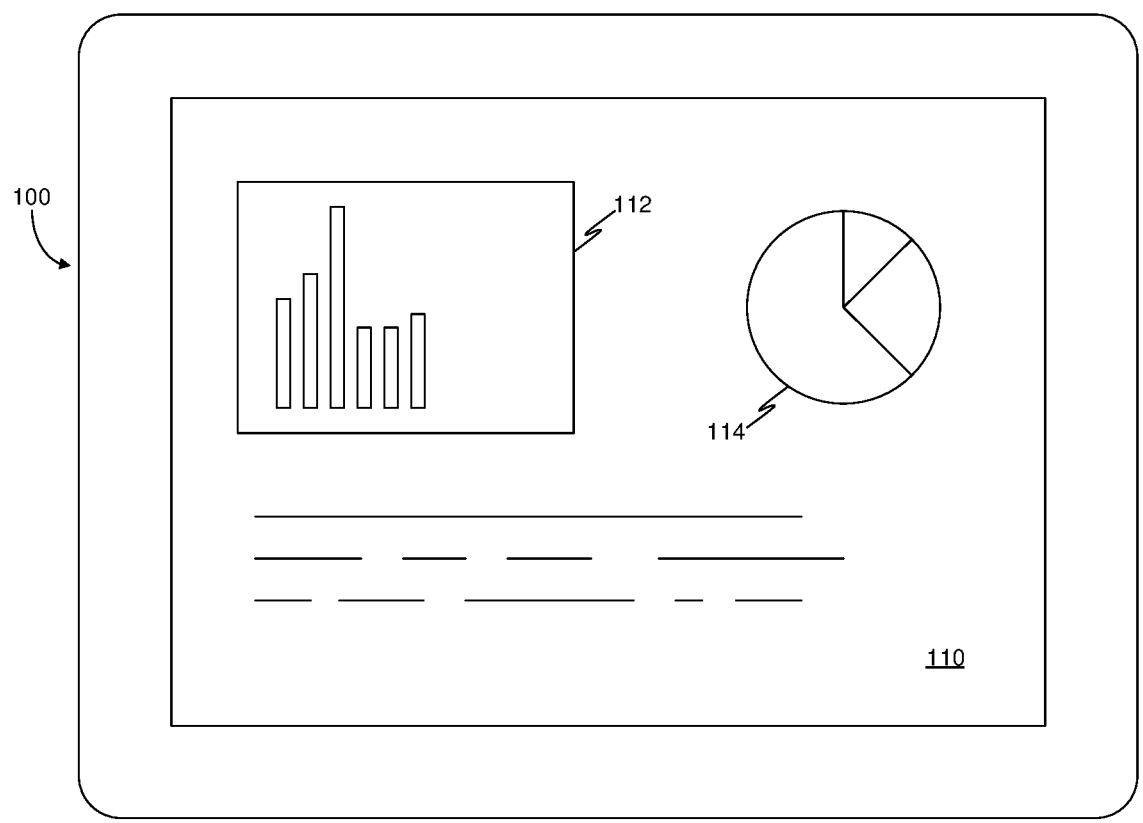
FIG. 1 is a schematic illustration of a business intelligence (BI) system dashboard implemented in accordance with an embodiment.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various disclosed embodiments include a method and system for generating organizational memory for Business Intelligence (BI) systems based on semantic knowledge graphs. An event log including events is received. Each event of the event log is related to accessing of data from a data source such as, but not limited to, executing a query, updating a report widget, and the like. Each event is parsed to identify objects such as query objects and to determine relationships between the objects. A semantic knowledge graph is generated. The semantic knowledge graph is populated by nodes representing the identified objects and edges representing the determined relationships. Each edge may be assigned a score indicating a weight determined based on a number of appearances of its respective relationship in the parsed records. Each pair of nodes may have multiple edges between the nodes. In some embodiments, the semantic knowledge graph is customized to a user by identifying query nodes relevant to the user.

FIG. 1 is an example schematic illustration of a user device 100 displaying a business intelligence (BI) system dashboard 110. The dashboard 110 may be part of a user interface (not shown) which is designed to convey data and insights based on the data to a user of the device (not shown) on which the UI is executed. The device may be a suitable computing device having at least a display and an input device such as a keyboard, mouse, touchscreen, and the like.

The dashboard 110 includes one or more widgets. A widget is a graphical rendering generated based on data which may be received by executing a query on a relational database (or another data source) and generating the graphical representation based on the resulting data received as a result of executing the query. In the example implementation shown in FIG. 1, the dashboard includes a bar graph widget 112, a pie graph widget 114, and a query textual input interface 116.

A user interacting with the user interface 110 may request, for example, to update the data represented in one or more of the widgets or to present data based on a different temporal view (e.g., a different range of time). In other examples, a user may input a query to be executed on one or more data sources through the user interface. The result of executing the query is returned for display on the dashboard 110.

Figure 2:
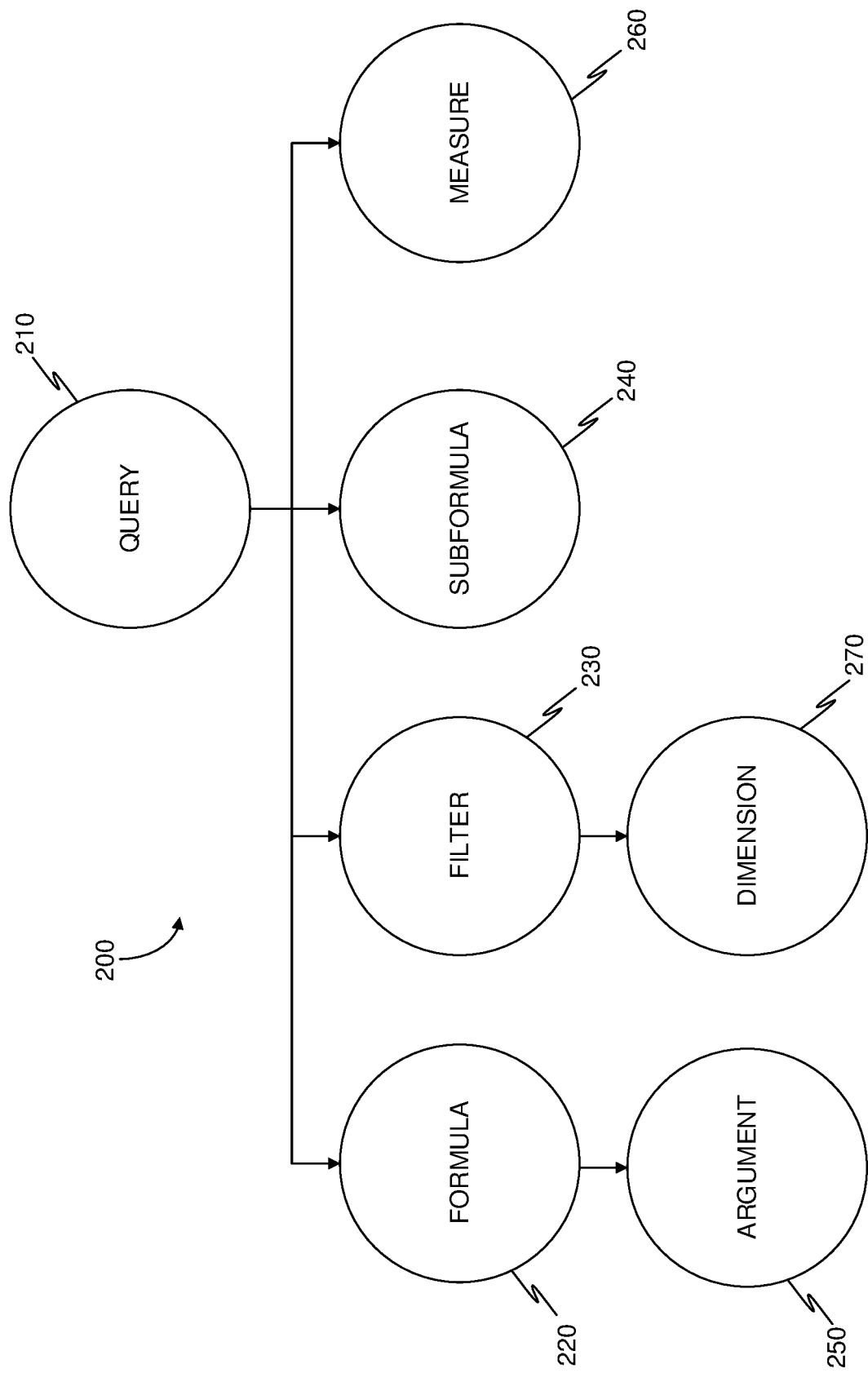
FIG. 2 is a schematic illustration of a query structure implemented in accordance with an embodiment.

FIG. 2 is an example illustration of a query structure 200. In the example implementation shown in FIG. 2, the query structure 200 includes one or more formulae 220, a filter 230, one or more sub-formulae 240, an argument 250, a measure 260, and a dimension 270.

Each formula 220 may be a higher degree of one of the sub-formulae 240. The query graph structure 200 may be used to represent any query in a graph structure including nodes and connections. The connections may be relations between the nodes represented as edges in the graph structure. Throughout this disclosure, relations, relationships, edges and links are all used interchangeably with regards to nodes and vertices. The formulae 220, measure 260, or dimension 270 may be used for filtering by filter 230. It is readily understood that a formula may have a filter in a sub-formula thereof.

Figure 3:
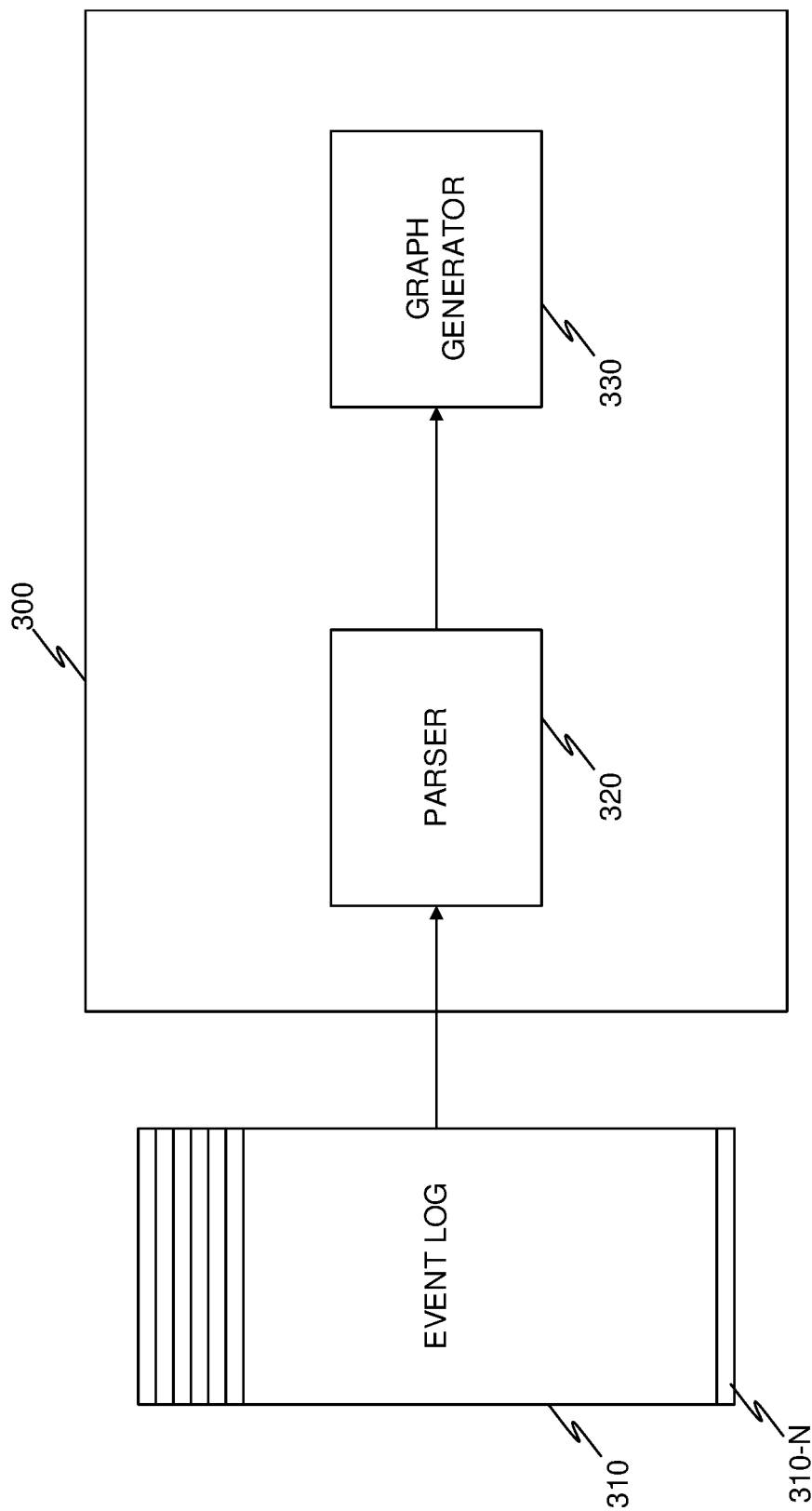
FIG. 3 is a schematic illustration of a system for generating a semantic knowledge graph according to an embodiment.

FIG. 3 is a flow diagram illustrating a system 300 for generating a semantic knowledge graph according to an embodiment. The system 300 is configured to receive one or more event logs 310. An event log 310 includes a plurality of events such as event 310-N (where 'N' is an integer having a value of '2' or greater). Each event is generated in response to instructions executed with respect to a dashboard (e.g., the dashboard 110 of FIG. 1).

In certain embodiments, event logs may record events which are generated in response to executing instructions on a data source such as, for example, executing a structured query language (SQL) query on a database. As a non-limiting example, a dashboard user interface may request to execute a JAQL (JSON query language) expression with respect to a BigData data source. The JAQL expression is then stored in the event log 310.

The event log 310 may also store events such as, but not limited to, a request to change a temporal view of a widget, a request to filter data in a widget, a request to perform an active or passive instruction, and the like. A passive instruction is performed automatically. For example, when loading a dashboard, certain queries are to be executed in order to at least initially populate the widget with data results. Active instructions may be queries requested by a user, filtered views request by the user, and the like.

The event log 310 is fed into a parser 320. The parser 320 is configured to receive one or more events of the event log and to parse the events into a data format for the graph generator 330. The parser 320 may be further configured to detect objects within an event. An object may be, but is not limited to, a formula, filter, argument, element, or sub-formula, for example as shown in FIG. 2 above. The parser 320 may be further configured to determine a relationship between one or more objects based on the event.

In some implementations, the relationship between objects may be defined with respect to a hierarchy. Further, the hierarchy may be directional (i.e., top to bottom or vice-versa) such that relationships may be further defined with respect to the direction from one node to another in a hierarchy. As a non-limiting example, a node representing "Alice" may be higher in a hierarchy than a node representing "Bob" such that the relationship between "Alice" and "Bob" is "parent-child". A hierarchy may also be determined based on metadata of the data sources.

It is important to note that the semantic knowledge graph may be generated without access to the data itself by accessing the event log, metadata of the data source(s), or a combination thereof. This may be useful if a graph is being generated either by or for a third party which is not privy to the underlying data.

The graph generator 330 is configured to generate semantic knowledge graphs based on the parsed event logs. For example, the graph generator 330 may be configured to detect a first object having a relationship to a second object. The graph generator 330 may further be configured to assign a weight to the relationship. In this example, the first object may appear once with a "SUM" relationship to the second object, and eleven instances with an "AVG" relationship to the second object. Therefore the "AVG" relationship would carry a higher weight.

In an embodiment, the graph generator 330 may be configured to generate a graph based on all possible relationships between all detected objects. The graph generator 330 is configured to assign weights to each relationship based on the relations extracted and parsed from the event log 310. In some embodiments, one or more relations of the semantic knowledge graph can be based on interactions of one or more users with the system 300. For example, an event log may indicate a user which performed or requested to perform certain operations. Two objects may have a relationship having a first weight from the perspective of a first user, and a second weight from the perspective of a second user.

In another embodiment, a semantic knowledge graph may be generated with respect to a user based at least partially on events which the user (e.g., via a user account or user device) initiated. In certain embodiments, a semantic knowledge graph may be generated based on the event logs of multiple users such as, but not limited to, users who belong to a certain organization or group within an organization. The weights attached to the relations in the semantic knowledge graph may be default set weights. The default weights can be then adjusted for each existing or new user by the system 300 based on events generated by the user. This allows for retention of some organizational memory as well as for customization of a user's experience of a user accessing a BI system. In some embodiments, the graph generator 330 may be further configured to generate a graph for a user account based on permissions of the user. For example, a certain user may be unauthorized to view data associated with certain objects, in which case the graph generator 330 may determine to preclude a corresponding node from the graph provided to that user.

Figure 4:
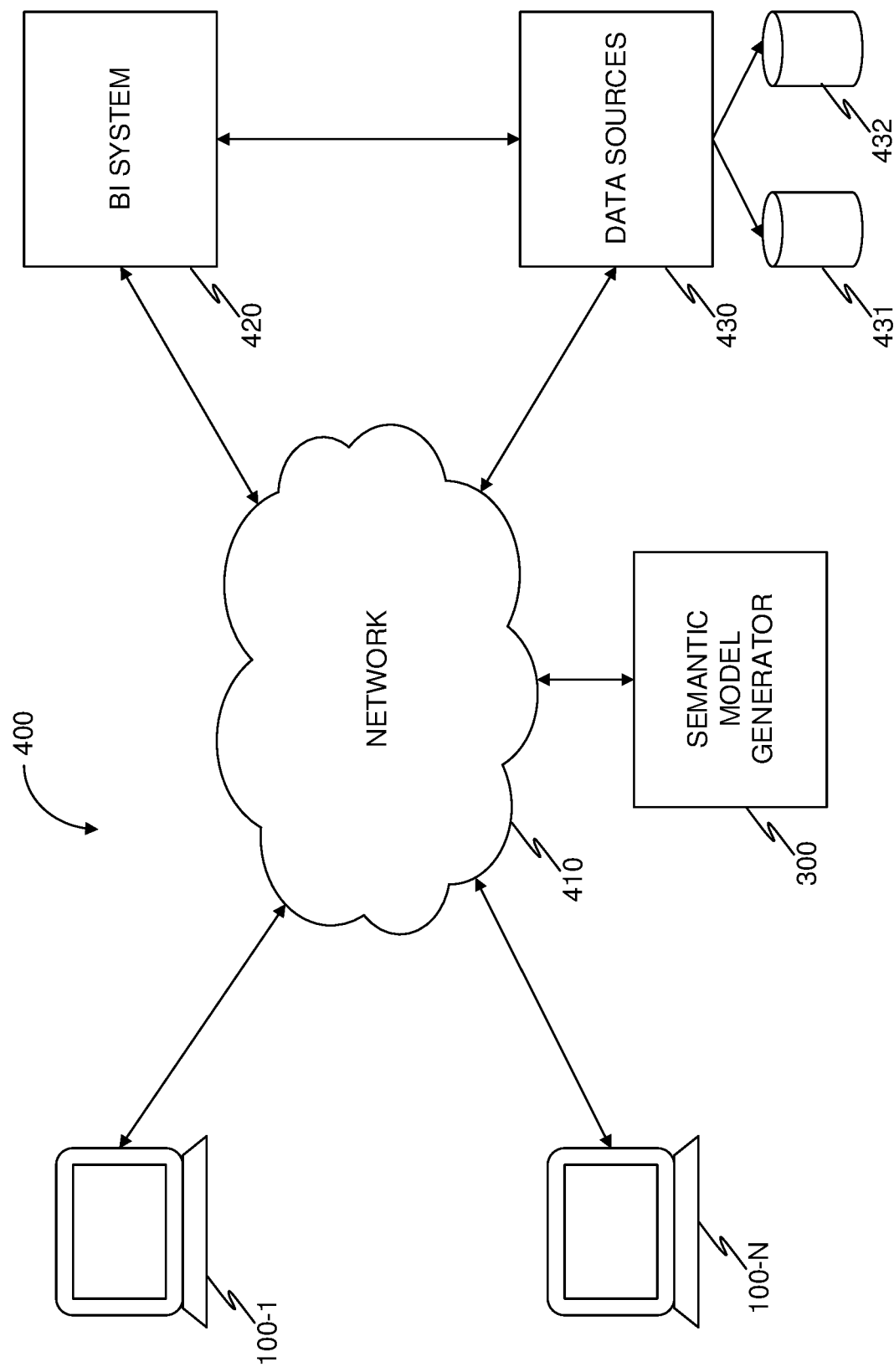
FIG. 4 is a schematic illustration of a network diagram illustrating a semantic model generator system used with a BI system utilized to describe various disclosed embodiments.

FIG. 4 is a network diagram 400 utilized to describe various disclosed embodiments. A plurality of user devices 100-1 through 100-N (where 'N' is an integer having a value of '2' or greater) are communicatively connected to a network 410.

The network 410 may be, but is not limited to, a wireless, cellular or wired network, a local area network (LAN), a wide area network (WAN), a metro area network (MAN), the Internet, the worldwide web (WWW), similar networks, and any combination thereof. The network 410 further provides communicative connectivity for the semantic model generator system 300, for a business intelligence (BI) system 420, and one or more data sources 430.

In the example network diagram 300, the data sources 430 include a first database 431 and a second database 432. The BI system 420 is configured to generate a dashboard user interface (e.g., the user interface 110 displayed in FIG. 1). The BI system 420 may be communicatively connected to the data source 430 either directly or via the network 410. In an example implementation, the BI system 420 and the system 300 may be part of the same LAN.

The BI system 420 is configured to supply the client devices 100 with a dashboard user interface, and further to receive instructions (or requests) to execute queries with respect to the data sources 430. In some embodiments, the BI system 420 may allow the system 300 to access an event log 310 stored therein. In other embodiments, the event log may be stored on the system 300, for example by configuring a client device (not shown) to send each instruction to both the system 300 and the BI system 420. A query result is typically not included in the event log 310, nor provided to semantic model generator system 300.

Figure 5:
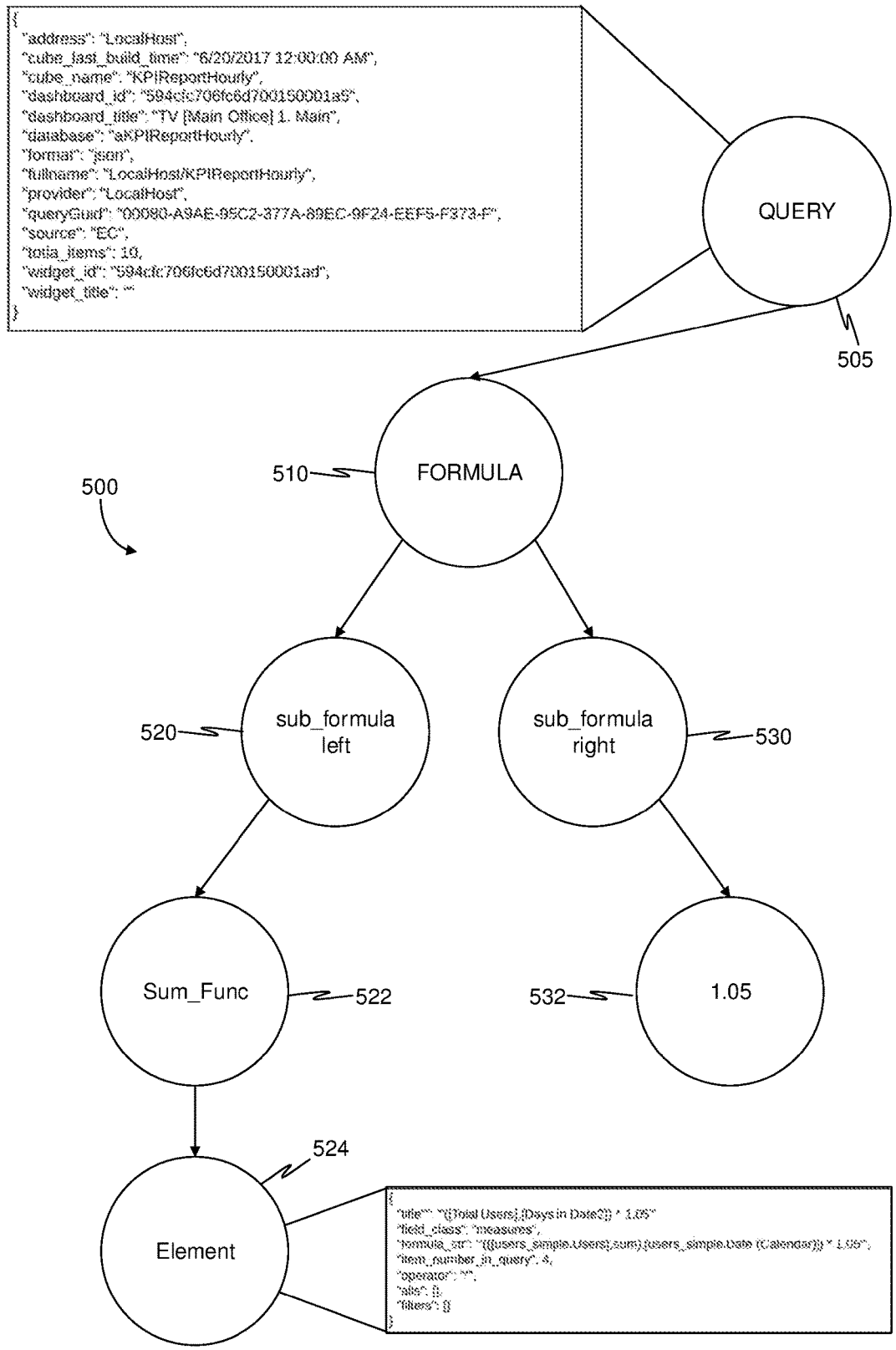
FIG. 5 is a query graph structure generated by a parser for a semantic knowledge graph generator implemented in accordance with an embodiment.

FIG. 5 is an example flow diagram 500 utilized to describe a query graph structure generated by a parser for a semantic knowledge graph generator.

A formula 510 is identified from a query 505. The formula 510 includes a left sub-formula 520 and a right sub-formula 530. The left sub-formula 520 includes a SUM function 522, which itself includes a data element 524. The right sub-formula 530 includes a textual object 532. Each identified object shown in FIG. 5 has at least one relationship with another object.

In an embodiment, the query graph structure is provided as an input for the graph generator 330 of FIG. 3. The graph generator 330 may be configured to incorporate the information of the query graph structure into a larger graph stored therein. One method of incorporating may involve determining if an object of the query graph structure exists in the larger graph and, if not, adding the object to the larger graph. Addition can be based on a relationship to another object which is a part of the larger graph that also appears in the query graph structure.

Another method of incorporation may include determining that a first object and second object exist in both the query graph structure and the larger graph and determining the relationship between the first and second object. If a new relationship is found, the new relationship may be added to the larger graph. If an existing relationship is found, the weight of the relationship between the two objects may be increased. Updating the graph may include, but is not limited to, re-generating the query graph structure, using all previous inputs, or combining previous inputs with new inputs (i.e. new objects, new relations, and combinations thereof).

Figure 6:
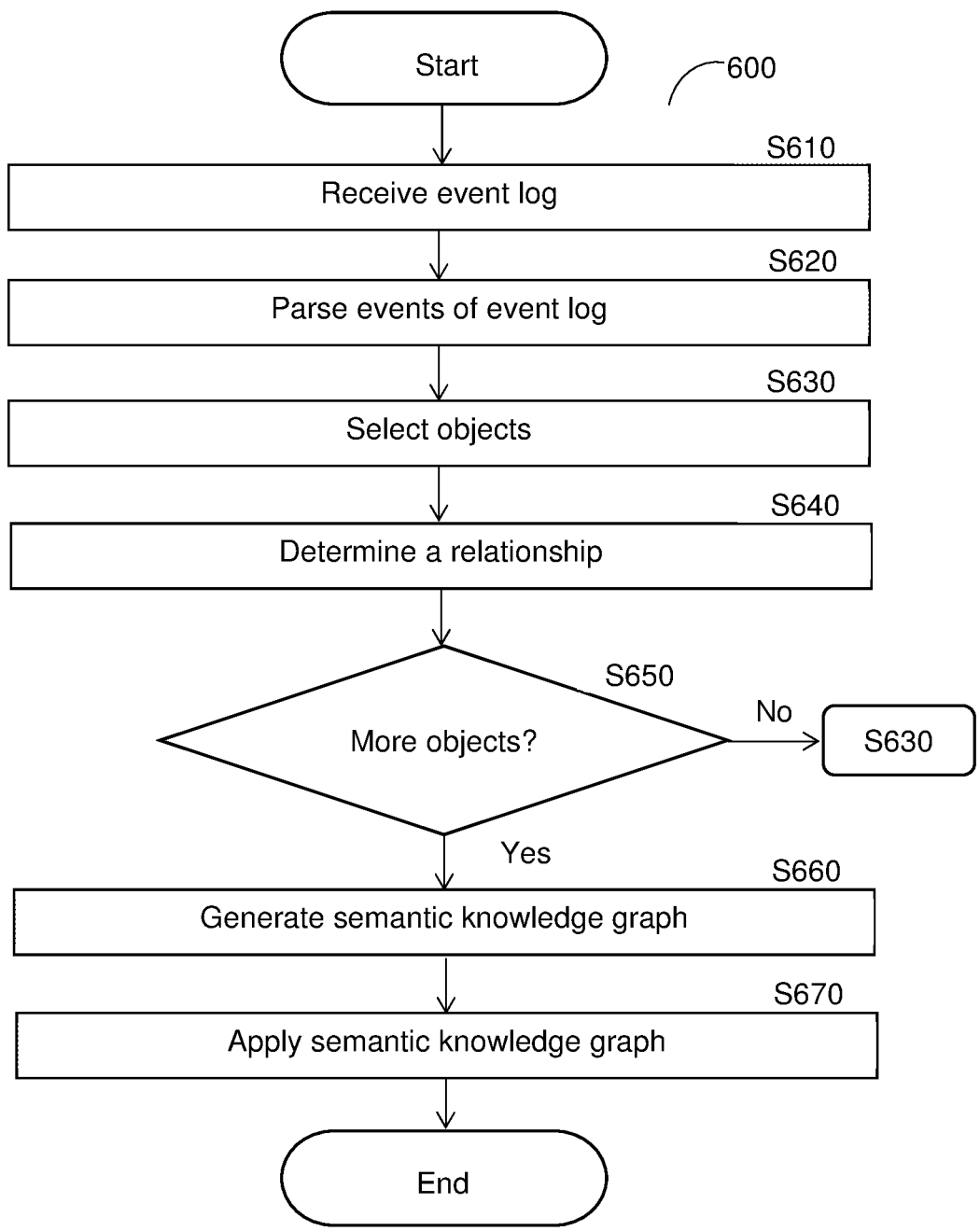
FIG. 6 is a flowchart of a method for generating a semantic graph from an event log of a BI system according to an embodiment.

FIG. 6 is a flowchart 600 illustrating a method for generating a semantic knowledge graph from an event log of a BI system according to an embodiment. In an embodiment, the method is performed by the system 300 of FIG. 3.

At S610, an event log is received. The event log includes a plurality of events and may be continuously updated. In some embodiments, an initial event log is received, and thereafter events are received either as they occur, periodically, or both. For example, when there is a high volume of events, the events may be received periodically; and when there is a low volume of events, the events may be received as they occur. Events may be instructions related to loading a dashboard, loading a widget, executing one or more queries on one or more data sources, changing a filter on a query, changing a view of a widget, and the like.

At S620, each event of the received event log is parsed to identify objects and relations of those objects to one another. A parsed event may include, but is not limited to, a plurality of query objects and relations thereof. In some embodiments, objects may be further associated with metadata of a columnar relational database. The metadata may be received from a BI system, or by requesting the metadata from the data sources.

At S630, objects are selected from among the identified objects in the parsed event(s).

In some embodiments, multiple objects are received and every possible relationship between each pair of two objects from among the objects is determined. Each relationship is further associated with a weight, which is increased based on a number of appearances in a parsed event.

At S640, a relationship is determined between at least a first object and a second object among the identified objects. In some embodiments, the first object, second object, or both, may each have relations to a plurality of other objects. In certain embodiments, the first object and second object may have a plurality of different relations to each other. For example, an object "SALARY_INCOME" may have both a "SUM" and an "AVG" (average) relationship to an object "INVESTMENT_INCOME," depending on the query being executed.

At S650, it is determined if additional objects should be added to the model and, if so, execution continues with S630; otherwise, execution continues with S660. The semantic model may be stored in a memory of a user device, at a network accessible storage device, and the like.

At S660, a semantic knowledge graph is generated (or updated, if one already exists) based on the determined relationships between objects. Generating the semantic knowledge graph may include determining a plurality of query objects and the identified relations between them. In some embodiments, a semantic knowledge graph is generated by identifying a plurality of query objects and generating all possible relations between them. Weights are added to the relations based on the determined relations from the parsed events.

In some embodiments, a semantic knowledge graph may be generated based on a user account. In such embodiments, it may be further useful to determine a link between a user account and each event of the parsed event log, and to only input the parsed events which are linked to the user account into the semantic model.

In some embodiments, a general semantic model is generated for a group of users, which possibly have a dashboard or widget as a common feature. The general semantic model (also referred to as organizational memory model) may include identified objects and relations between the objects, each relationship further carrying a weight. A copy of the organizational memory model may then be associated with a user account and updated by only parsing events which pertain to the user account without changing the original organizational memory model.

The original organizational memory model may be continuously updated by inputting events from all users such that when a new user joins the organization (i.e., a group of users), the new user is presented with a seeded model, which may be customized to the user's needs over time based on use of the model by the user. As a non-limiting example, two users are presented with a copy of a first organizational memory model. Each user, through use, adapts the model (i.e. causes changes to weights of query object relationships) to their usage pattern. The first user adds an object to their copy of the organizational model which the second user does not use, and is therefore not present in the second user's model. However, by continuously updating the first organizational memory model, the added object is present in the model when a third user joins the group, providing the third user with a more enriched model, and therefore more potential to gain insights from data. In some embodiments, individual user models may be updated based on a current version of the general organizational memory model.

In certain embodiments, a node, a relation, or both, may be culled from a semantic knowledge graph. Culling may be done based on, for example but not limited to, frequency of use, values of weights (e.g., relationships having weights below a threshold may be culled), vector distance (e.g., relationships having vector distances exceeding a threshold may be culled), combinations thereof, and the like. The culling may be performed, for example but not limited to, periodically.

In some embodiments, it may be advantageous to maintain snapshots of a semantic model to allow for reverting changes. Snapshots can be stored, for example, periodically. Multiple snapshots may be maintained, for example, for personalized models associated with different user accounts, for the original model, or both. Snapshots may also be stored in response to certain changes of the model. As a non-limiting example, adding or culling a node may trigger storing a snapshot while changing a weight of a relation, adding a relation, or removing a relation, may not.

At optional S670, the semantic knowledge graph is applied. Applying the semantic knowledge graph includes determining one or more outputs based on the organization of the semantic knowledge graph. Such outputs may include, but are not limited to, suggested fields, widgets in reports, user profiles or portions thereof, cache contents to be used for cache warmups, and the like.

Figure 7:
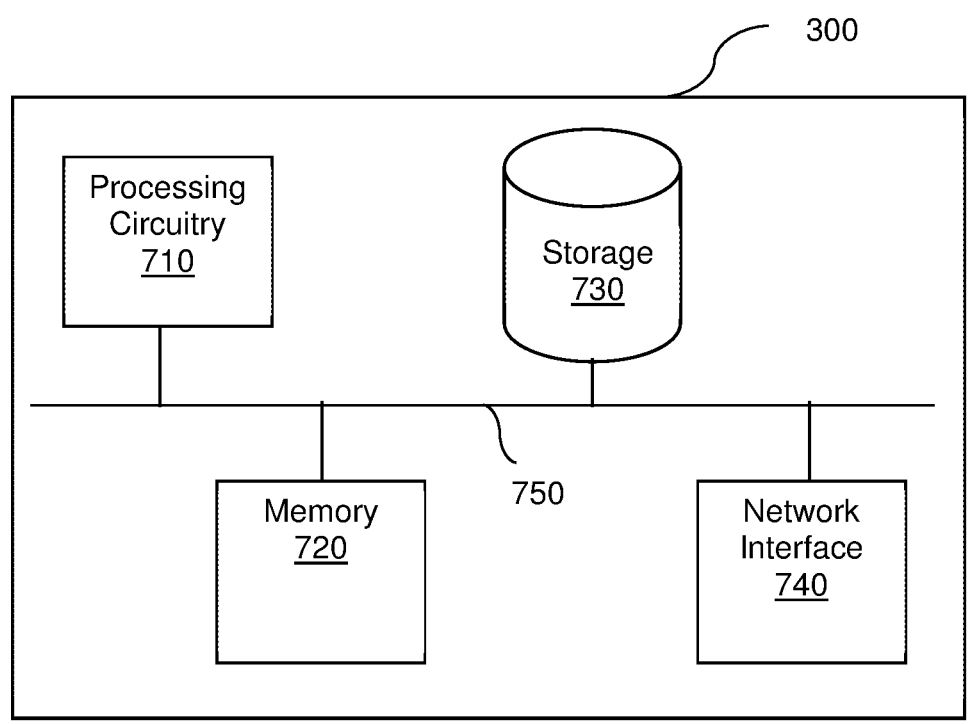
FIG. 7 is a schematic illustration of a semantic knowledge graph generator system according to an embodiment.

FIG. 7 is an example schematic diagram of a semantic knowledge graph generator system 300 according to an embodiment. The semantic knowledge graph generator system 300 includes a processing circuitry 710 coupled to a memory 720, a storage 730, and a network interface 740. In an embodiment, the components of the semantic knowledge graph generator system 300 may be communicatively connected via a bus 750.

The processing circuitry 710 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 720 may be volatile (e.g., random access memory, etc.), non-volatile (e.g., read only memory, flash memory, etc.), or a combination thereof.

In one configuration, software for implementing one or more embodiments disclosed herein may be stored in the storage 730. In another configuration, the memory 720 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 710, cause the processing circuitry 710 to perform the various processes described herein.

The storage 730 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 740 allows the semantic knowledge graph generator system 300 to communicate with a network (e.g., the network 410, FIG. 4).

It should be understood that the embodiments described herein are not limited to the specific architecture illustrated in FIG. 7, and other architectures may be equally used without departing from the scope of the disclosed embodiments.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for generating a semantic graph by a computer system based on interactions with a data source, comprising:
   receiving events by the computer system;
   parsing, by the computer system, each of a plurality of the received events into a plurality of objects, wherein the plurality of events includes a plurality of queries, wherein each event of the plurality of events is related to an interaction with at least one data source;
   determining, by the computer system, for each of the plurality of events, a relationship between two objects of the plurality of objects;
   generating, by the computer system, a semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a relationship between the objects connected by the edge;
   repeating, by the computer system, the receiving, parsing, determining, and generating so as to cause the semantic knowledge graph to be updated continually over time as events occur; and
   assigning a score to each edge, wherein the score assigned to each edge indicates a weight of the edge, wherein the score assigned to each edge is determined based on a number of appearances of the relationship represented by the edge in the parsed plurality of events.

2. The method of claim 1, wherein the plurality of events is indicated in a record log including a plurality of records, wherein the plurality of records are records of queries executed on the at least one data source.

3. The method of claim 1, wherein each object is any of: a formula, a filter, a subformula, a measure, an argument, and a dimension.

4. The method of claim 1, wherein a plurality of events received in an initial receiving of events is a plurality of first events, wherein the plurality of objects is a plurality of first objects, further comprising:
   parsing a second event, the second event being received in a repetition of the receiving events;
   determining, based on the parsed second event, a relationship between two objects of a plurality of second objects;
   updating the semantic knowledge graph based on the determined relationship by adding an edge to the plurality of edges to the semantic knowledge graph, wherein the added edge represents the relationship between the objects of the plurality of second objects.

5. The method of claim 4, wherein each edge is assigned a score, wherein the score assigned to each edge is determined based on a number of appearances of the relationship represented by the edge in the plurality of events.

6. The method of claim 5, wherein updating the semantic knowledge graph further comprises:
   updating the score of the edge representing the relationship between the objects of the plurality of second objects when the relationship between the objects of the plurality of second objects is represented by an existing edge of the semantic knowledge graph.

7. The method of claim 1, further comprising:
   determining a user identifier based on the parsed plurality of events; and
   generating the semantic knowledge graph based only on records including the user identifier.

8. The method of claim 1, further comprising:
   determining a user identifier based on the parsed plurality of events, wherein the score assigned to each edge is determined based further on a number of appearances of the user identifier in the parsed plurality of events.

9. The method of claim 1, wherein the plurality of events is a plurality of first events, further comprising:
   decreasing the weight of an edge of the plurality of edges based on a number of appearances of the relationship represented by the edge in a plurality of second events.

10. A non-transitory computer readable medium having stored thereon instructions for causing a processing circuitry to execute a process, the process comprising:
   receiving events by the processing circuitry;
   parsing, by the processing circuitry, each of a plurality of the received events into a plurality of objects, wherein the plurality of events includes a plurality of queries, wherein each event of the plurality of events is related to an interaction with at least one data source;
   determining, by the processing circuitry, for each of the plurality of events, a relationship between two objects of the plurality of objects;
   generating, by the processing circuitry, a semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a relationship between the objects connected by the edge;

repeating, by the processing circuitry, the receiving, parsing, determining, and generating so as to cause the semantic knowledge graph to be updated continually over time as events occur; and assigning a score to each edge, wherein the score assigned to each edge indicates a weight of the edge, wherein the score assigned to each edge is determined based on a number of appearances of the relationship represented by the edge in the parsed plurality of events.

11. A system for generating a semantic graph based on interactions with a data source, comprising:

a processing circuitry; and a memory, the memory containing instructions that, when executed by the processing circuitry, configure the system to:

receive events;

parse each of a plurality of events into a plurality of objects, wherein the plurality of events includes a plurality of queries, wherein each event of the plurality of events is related to an interaction with at least one data source;

determine, for each of the plurality of events, a relationship between two objects of the plurality of objects;

generate a semantic knowledge graph based on the determined relationships, the semantic knowledge graph including a plurality of query nodes and a plurality of edges, wherein each query node corresponds to a respective object of the plurality of objects, wherein each query node is connected to another query node of the plurality of query nodes by one of the plurality of edges, wherein each edge represents a relationship between the objects connected by the edge;

repeat the receiving, parsing, determining and generating, so as to cause the semantic knowledge graph to be updated continually over time as events occur; and assign a score to each edge, wherein the score assigned to each edge indicates a weight of the edge, wherein the score assigned to each edge is determined based on a number of appearances of the relationship represented by the edge in the parsed plurality of events.

12. The system of claim 11, wherein the plurality of events is indicated in a record log including a plurality of records, wherein the plurality of records are records of queries executed on the at least one data source.

13. The system of claim 11, wherein each object is any of: a formula, a filter, a subformula, a measure, an argument, and a dimension.

14. The system of claim 11, wherein a plurality of events received in an initial receiving of events is a plurality of first events, wherein the plurality of objects is a plurality of first objects, wherein the system is further configured to:

parse a second event, the second event being received in a repetition of the receiving events;

determine, based on the parsed second event, a relationship between two objects of a plurality of second objects;

update the semantic knowledge graph based on the determined relationship by adding an edge to the plurality of edges to the semantic knowledge graph, wherein the added edge represents the relationship between the objects of the plurality of second objects.

15. The system of claim 14, wherein each edge is assigned a score, wherein the score assigned to each edge is determined based on a number of appearances of the relationship represented by the edge in the plurality of events.

16. The system of claim 15, wherein the system is further configured to:

update the score of the edge representing the relationship between the objects of the plurality of second objects when the relationship between the objects of the plurality of second objects is represented by an existing edge of the semantic knowledge graph.

17. The system of claim 11, wherein the system is further configured to:

determine a user identifier based on the parsed plurality of events; and generate the semantic knowledge graph based only on records including the user identifier.

18. The system of claim 11, wherein the system is further configured to:

determine a user identifier based on the parsed plurality of events, wherein the score assigned to each edge is determined based further on a number of appearances of the user identifier in the parsed plurality of events.

19. The system of claim 11, wherein the plurality of events is a plurality of first events, wherein the system is further configured to:

decrease the weight of an edge of the plurality of edges based on a number of appearances of the relationship represented by the edge in a plurality of second events.

* * * * *